Nov. 3, 1964
R. M. MacINTYRE
3,155,834
MULTIPLE LEVEL LOGIC SYSTEM
Filed Jan. 30, 1961
3 Sheets-Sheet 1
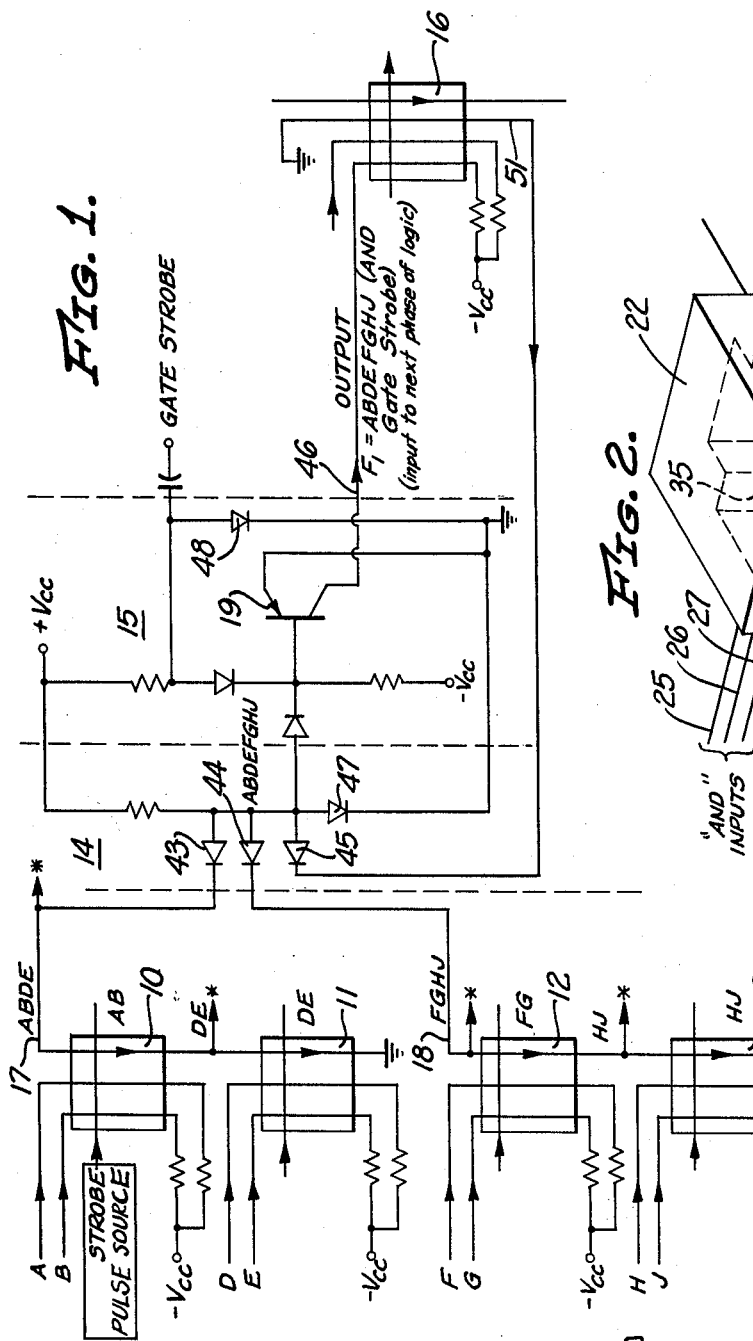
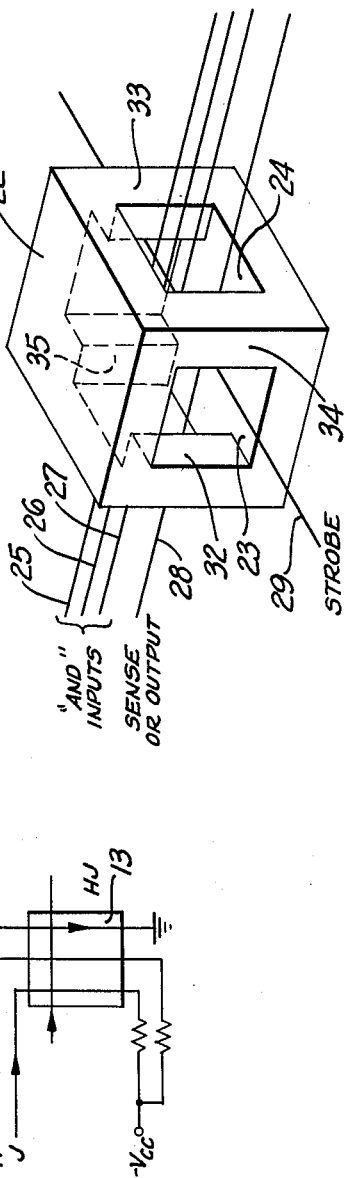
INVENTOR
ROBERT M. MacINTYRE
BY HIS ATTORNEYS
HARRIS, KIECH, RUSSELL & KERN

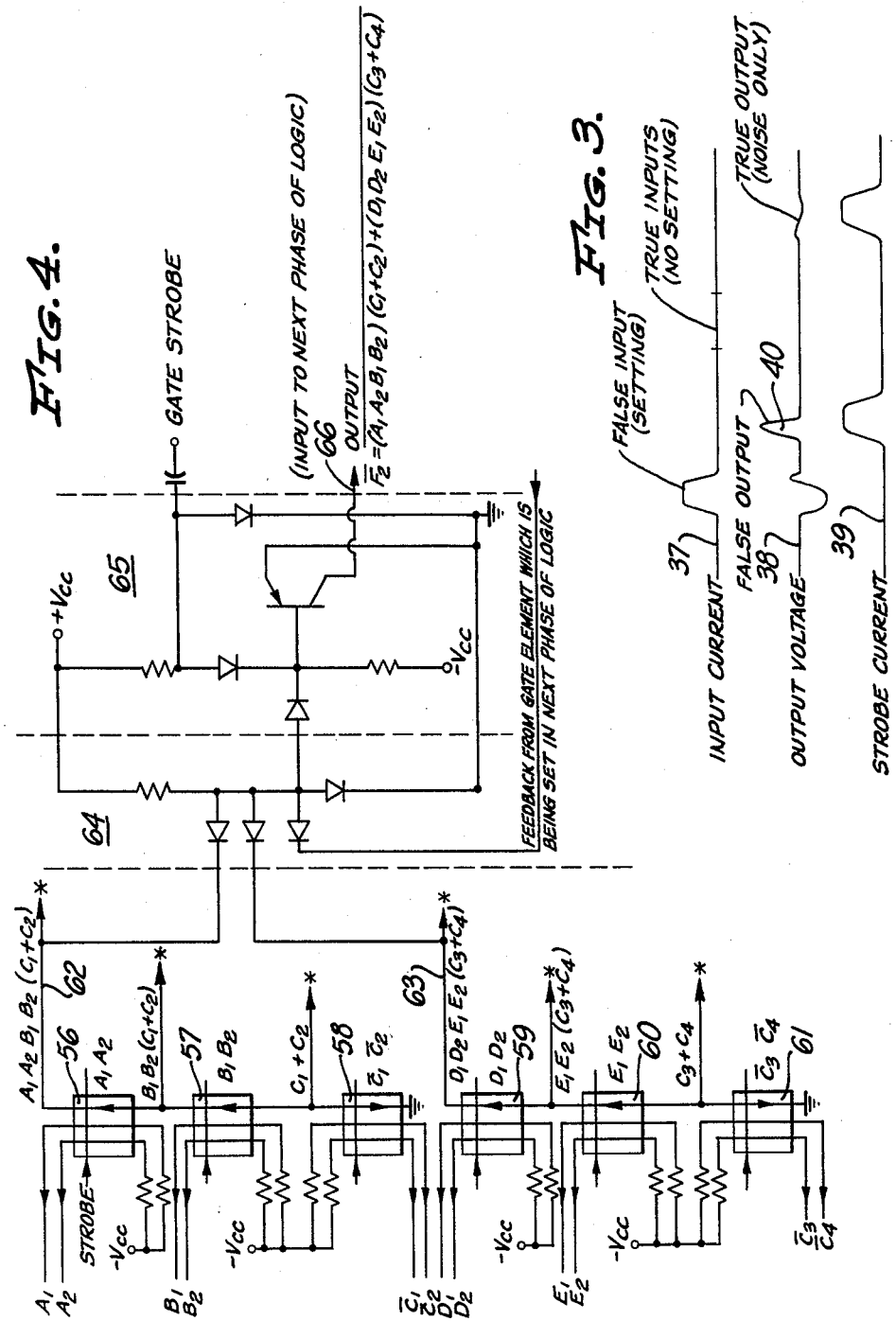

Nov. 3, 1964  R. M. MacINTYRE  3,155,834
MULTIPLE LEVEL LOGIC SYSTEM
Filed Jan. 30, 1961  3 Sheets-Sheet 3
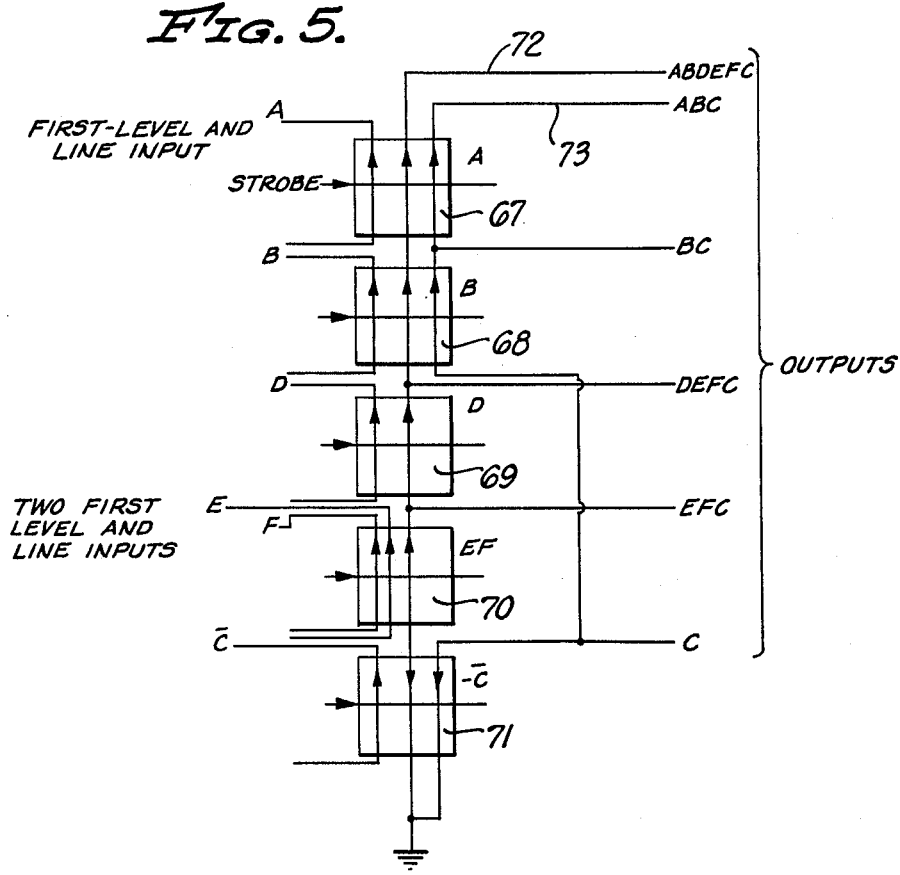
INVENTOR
ROBERT M. MacINTYRE
BY HIS ATTORNEYS
HARRIS, KIECH, RUSSELL & KERN

United States Patent Office 3,155,834
Patented Nov. 3, 1964

3,155,834
MULTIPLE LEVEL LOGIC SYSTEM
Robert M. MacIntyre, Newport Beach, Calif., assignor to Ford Motor Company, Dearborn, Mich., a corporation of Michigan
Filed Jan. 30, 1961, Ser. No. 85,753
15 Claims. (Cl. 307—88)

This invention relates to multiple level logic systems and, in particular, to systems for two, three and four level operations concurrently. It is an object of the invention to provide a multiple level logic system which can have a plurality of inputs at each level and which will provide an extremely large number of terms per system. A further object is to provide such a logic system which can operate at high rates, i.e., in excess of two million pulses per second, with low input power requirements and simplified circuitry, and one which is capable of performing parallel logic operations.

It is an object of the invention to provide a multiple level logic system which utilizes a plurality of magnetic gate elements for the first level logic with each of the gate elements comprising a block of magnetic material having two stable states of magnetic remanence and first and second nonparallel openings therethrough such that a current through an opening produces a flux about such opening and substantially zero net flux about the other opening. A further object is to provide such a system utilizing magnetic gate elements having intersecting, orthogonal openings therethrough. Another object is to provide such a system wherein the magnetic gtae elements may be wired individually prior to assembly except for a common output conductor which can be threaded through the assembled elements to provide the second level logic operation. It is a further object to provide magnetic gate elements which use only input current pulses and strobe current pulses for setting and resetting respectively, eliminating inhibit current requirements during setting.

It is an object of the invention to provide a multiple level logic system which can perform two level *anding*, three level *anding* or four level *anding*, i.e., *and-and*, *and-and-and*, *and-and-and-and*. A further object is to provide such a system wherein *oring* operations can be incorporated therein by substituting an *or* operation for an *and* operation at a level, or by performing both *and* and *or* operations at a single level.

It is a specific object of the invention to provide a multiple level logic system including a plurality of magnetic gate elements, a strobe conductor passing through the first opening of each of the elements respectively, means for generating a current pulse on the strobe conductor of each of the elements simultaneously, with the pulse of a magnitude to set the flux about the first opening to one state, a plurality of input current pulse conductors with at least one input conductor passing through the second opening of each element, means for generating input current pulses on predetermined input conductors, with the input pulses preceding the strobe pulses providing a first level *and* operation for the input conductors at each element, and an output conductor passing through the second opening of each of the elements providing a second level *and* operation for the outputs of each of the elements. A further object is to provide such a logic system including a gate circuit providing a third level logic operation with the inputs to the gate circuit including the output conductors of one or more strings of magnetic elements. Another object is to provide a multiple level logic system having an additional gate circuit providing a fourth level of logic with this gate circuit having the outputs of one or more third level gate circuits as inputs. Another object is to provide such a system wherein the fourth level gate circuit has only two inputs with one of these inputs corresponding to the strobe pulse of the magnetic elements to provide the timing for the system.

It is an object of the invention to provide a multiple level logic system which will produce an input current pulse for a magnetic element of a succeeding logic system having an output conductor of the element of the succeeding system connected back as an input to the third level gate of the preceding system. A further object is to provide such a feedback connection for the purpose of output pulse amplification so that each multiple level system will produce current pulses of amplitude and duration sufficient to set succeeding magnetic elements.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a schematic diagram of a preferred embodiment of the multiple level logic system of the invention;

FIG. 2 illustrates a magnetic gate element suitable for use in the system of FIG. 1;

FIG. 3 is a timing diagram illustrating the operation of the gate element of FIG. 2;

FIG. 4 is a diagram similar to FIG. 1 showing an alternative form of the invention; and FIG. 5 is a schematic diagram illustrating another alternative form of the invention.

FIG. 1 illustrates a four level *and* system including a plurality of magnetic gate elements 10, 11, 12, 13, a gate circuit 14, and another gate circuit 15. An additional magnetic gate element 16 of a succeeding logic system is also shown. Each of the magnetic elements of the system is shown with two inputs AB, DE, FG, and HJ, respectively. Of course, one or three or more inputs can be used as dictated by the particular operations to be performed. The first level of *anding* occurs in the individual gate elements, as will be explained in detail below. The elements 10 and 11 have a common output conductor 17 and the second level of *anding* appears on this conductor. Similarly, the *and* products of the elements 12, 13 are *anded* on the conductor 18.

The gate circuit 14 is shown as a conventional diode gate which performs the third level *and* operation. Similarly, the gate circuit 15 is a conventional diode gate which performs the fourth level *and* operation. An amplifier, here shown as a transistor 19, is ordinarily used at the output of the four level system to provide a driving current for subsequent use, such as an input to the gate element 16.

One of the magnetic gate elements is shown in FIG. 2. The element comprises a block 22 of magnetic material having two stable states of magnetic remanence. Openings 23, 24 are provided in the block. A plurality of input conductors 25, 26, 27 and a sense or output conductor 28 are passed through the opening 24. A strobe conductor 29 is passed through the opening 23. Each of the conductors is shown as a single turn winding, but any conductor may be looped through the opening one or more times to provide a multiturn winding when desired.

The shape of the block 22 is not critical and the openings 23, 24 are disposed relative to each other such that their axes are nonparallel. Then a current in a conductor through an opening can produce a flux about such opening with substantially zero net flux about the other opening. This relation is best achieved by having the openings at right angles to each other and intersecting. The openings may be displaced from each other but it preferred that there be no magnetic material between the openings at their crossing. Any magnetic material will be suitable for use with the gate element and pressed ferrite materials are presently being used. The blocks of the form of FIG. 2 now in use are in the order of 0.050 x 0.050 x 0.050 inch. This cubic shape block with intersecting openings is an efficient form providing a maximum of gating operations with a minimum of volume. The shape uses a minimum of working material permitting higher speed operation and lower drive currents. The individual blocks are customarily mounted on a plate having high heat flow characteristic permitting cooling by conduction and the cubic shape provides a maximum surface contact with the mounting plate for minimum mganetic flux path length.

The operation of the magnetic gate element is as follows. When a sufficient amount of current is applied to one or more of the input conductors, the magnetic material around the opening 24 will become saturated or set in one state of magnetic remanence. Then when a current is applied to the strobe conductor of a magnitude to saturate the magnetic material about the opening 23, the magnetic flux in one pair of diagonally opposing legs (e.g., legs 32, 33) will reverse while the flux in the opposite pair of diagonally opposed legs (legs 34, 35) will shuttle. The increase of flux from a magnetic remanence state to a maximum in the same polarity and return to the remanence state is defined as shuttling. The flux reversal generates an output pulse on the output conductor. The shuttle flux in the shuttle legs cancels the shuttle portion of the flux changing in the switching legs. Hence the output pulse does not have an overshoot. This is seen in FIG. 3 discussed below. Of course, an input conductor could also be used as the output conductor but usually the switching requirements for this arrangement are more complex than the provision of separate input and output conductors.

If one or more of the input conductors carry current, the output conductor will have a pulse output during the strobe interval. The absence of current on the input conductors between strobe intervals leaves the flux state unchanged and when the next strobe pulse occurs, no flux switching takes place. If no current in any *and* input conductor is considered the true condition, and a current is considered the false condition, then no pulse generated on the output conductor during the strobe period is a true output and a pulse is a false output. This operation is illustrated in FIG. 3 wherein the input current to an input conductor is indicated by curve 37, the output voltage on the output conductor is indicated by curve 38, and the strobe current on the strobe conductor is indicated by curve 39. It is seen that an input current which sets the flux about the opening 24 also produces an output on the output conductor However, the system output is blanked or gated off during this period so that no output is generated from the system. A false output is shown by the pulse 40 while a true output is substantially no pulse, the noise produced being primarily due to imperfect cancelling of shuttling flux. In present day components, the signal-to-noise ratio is in the range of fifty to one and higher. This magnetic gate element is especially suited for high speed operation as no inhibit action occurs and the currents, flux switching and heating associated with inhibiting action are eliminated.

FIG. 1 illustrates a system for performing the operation $F_1 = ABDEFGHJ$. The strobe conductors for each of the elements 10, 11, 12, 13 may comprise a single conductor laced through all of the elements or may comprise four separate conductors operated in parallel. The elements will be strobed simultaneously and the arrows on the input and output conductors indicate the relative polarities of the connections. The gate 15 is not used in performing a logic operation but is used only as a timing gate with the gate strobe being applied concurrently with the strobe pulse to the gate elements. Actually, circuit 15 is a gate circuit and a logic input can be applied in place of the gate strobe to produce a fourth level *and* operation.

If no current is permitted in any of the inputs A, B, D, E, F, G, H, and J, none of the magnetic elements will be set. Then during the strobe interval, no output pulse will appear on the output conductors 17, 18. With no negative pulses present at the input diodes 43, 44, 45 of the gate circuit 14, there will be no current on the output line 46. Hence, when there is no current present on any of the input conductors A-J, no current will be present at the output of the system and $F_1$ will be true for this condition and only this condition. If there is current in one or more of the input conductors A-J during the setting interval, a pulse will appear on the corresponding output conductor 17, 18 during the strobe interval resulting in energization of the transistor 19 and a current in the output conductor 46. This means that $F_1$ is false.

In the gate circuit 14, diode 47 functions as a voltage clamp for protecting the circuit and is not a necessary element of the logic system. Similarly, in the gate circuit 15, diode 48 functions as a voltage clamp and is not essential.

A third input to the gate circuit 14 is provided from an output conductor 51 of the gate element 16 of the next succeeding logic system which has the output conductor 46 of the system of FIG. 1 connected as an input thereto. This feedback arrangement provides a pulse amplifying or pulse stretching function and while desriable in many applications, is not a necessary feature of the logic system. The conductor 51 provides a positive feedback connection which maintains the gate circuit 15 on or energized for the entire duration of the gate strobe pulse once the gate is energized, even though the pulse or pulses from the magnetic gate elements are of shorter duration than the gate strobe pulse. Setting of a magnetic gate element is a function both of the amplitude and duration of the current pulse, referred to herein as the magnitude of the current pulse. The positive feedback arrangement is a desirable feature in that it permits operation with lower current amplitudes while obtaining the necessary magnitude to set a gate element by extending the duration of the output current pulse.

The specific arrangement of FIG. 1 may be varied to mechanize other logical operations as is readily apparent from an analysis of the individual operations performed at each level in the system. Also, it should be noted that additional inputs can be achieved by using additional gate elements on an output conductor string and by using additional input connections to the gate circuits 14 and/or 15. Also, the results of individual logical operations in the system may be used for mechanizing other logical functions if so desired. For example, the outputs indicated by asteriks in FIG. 1 may be connected into other logic systems as well as being used in the system of FIG. 1. Some additional specific examples of variations will be discussed in conjunction with FIG. 5.

Typically the system of FIG. 1 can be used to handle a total of four hundred and fifty inputs. This may be accomplished by providing a three input *and* function in the first level at each magnetic gate element, a ten input *and* function at the second level by using ten gate elements on an output conductor, and a fifteen input *and* function at the third level by connecting fifteen such output conductors as inputs to the gate circuit 14. Multiplying three by ten by fifteen provides a total of four hundred and fifty inputs, with the fourth level being used exclusively for timing.

FIG. 4 illustrates an alternative form of a multiple level logic system of the invention as used to perform a more complex logical operation. The system of FIG. 4 performs *and* operations at the first, second and fourth levels and an *or* operation at the third level. Also, *or* operations can be performed at the first level in conjunction with the *and* operations.

The system includes a plurality of magnetic gate elements 56, 57, 58, 59, 60, 61 which are the same as the magnetic gate elements of FIGS. 1 and 2. An output conductor 62 threads the gate elements 56, 57, 58 and an output conductor 63 threads the gate elements 59, 60, 61. A gate circuit 64 provides the third level *or* operation and another gate circuit 65 provides the fourth level *and* operation. The fourth level operation is used for timing only in the same manner as in the system of FIG. 1. Also, feedback is provided from the output of the system to the input of the third level gate circuit as in the system of FIG. 1.

The inputs to the individual gate elements are identified to the left of the gate elements as in FIG. 1 and the entire system mechanizes the equation $$\overline{F_2} = \overline{A_1 A_2 B_1 B_2 (C_1 + C_2) + D_1 D_2 E_1 E_2 (C_3 + C_4)}$$

The results of the first level logic operation are indicated to the right of each gate element and the results of the second level logic operations are indicated at the output conductors. Definition of the input and output currents are the same as for FIG. 1 with no current being true and current being false. At certain stages within the system, the definitions are different than for FIG. 1 because of the *oring* operations. It should be noted that the output conductor 62 passes through the gate element 58 in a direction to provide a pulse of opposite polarity to that of gate elements 56, 57. The output conductor 63 is similarly arranged in the gate element 61.

For the true case, no current flows in any of the normal inputs, i.e., the inputs to elements 56, 57, 59 and 60. This means that the magnetic material in these elements will not be set around the input conductors. The normal true input of a C input is no current flow, therefore, all the $\overline{C}$'s will have current flow and the magnetic material about the input conductors of the corresponding elements will be set for the true condition. When a strobe pulse occurs, a signal in the form of a negative pulse will be produced on an output conductor passing through an element set by a normal true $\overline{C}$ input. A negative pulse on one or both of the output conductors 62, 63 will pass the gate circuit 64 (which functions as an *or* gate), actuate the amplifier and cause current flow on the $\overline{F}_2$ output conductor 66. This means that $\overline{F}_2$ is false. Similarly, the expression $$F_2 = A_1 A_2 B_1 B_2 (C_1 + C_2) + D_1 D_2 E_1 E_2 (C_3 + C_4)$$

is true. The only time no current will flow on the $\overline{F}_2$ output conductor is when $A_1$ or $A_2$ or $B_1$ or $B_2$ or $C_1$ and $C_2$ and $D_1$ or $D_2$ or $E_1$ or $E_2$ or $C_3$ and $C_4$ are false, which causes elements 56 or 57 or both and elements 59 or 60 or both to be set around the input conductors or elements 58 and 61 to remain unset around the input conductors. Then when the strobe pulse occurs, a positive pulse is produced on the corresponding output conductor 62 or 63 cancelling the negative pulse produced by the element 58 or 61 if such pulse is present. This results in no pulse or a positive pulse on the output conductor as an input to the third level gate circuit 64, keeping the transistor amplifier off. This results in no current on the output conductor 66 meaning $\overline{F}_2$ is true and $F_2$ is false. In this arrangement, an *oring* operation occurs for the C inputs as indicated by the expressions $C_1 + C_2$ and $C_3 + C_4$.

An important feature of the multiple level logic system is that the two level *anding* operation achieved with the plurality of magnetic gate elements can be utilized at many different inputs. For example, if four magnetic gate elements each produced one of the terms, A, B, C, D, then fifteen *and* operations can be mechanized by suitable routing output conductors. These fifteen operations are: A, B, C, D, AB, BC, DC, AC, BD, AD, ABC, BCD, ABD, ACD and ABCD. The use of additional magnetic gate elements provides an enormous increase in the possible combinations.

A specific example of multiple outputs using more than one output conductor is shown in FIG. 5 wherein five magnetic gate elements 67–71 are utilized. The gate elements 67, 68, 69 and 71 each have single inputs A, B, D and $\overline{C}$ respectively. The gate element 70 has two inputs E, F. One output conductor 72 threads each element, going through element 71 in reverse polarity providing the operation ABDEFC. Another output conductor 73 threads the elements 67, 68 and 71, going through the element 71 in reverse polarity, providing the operation ABC. Each of the output conductors may be tapped as indicated to provide other operations.

In the system of FIG. 5, a current on an input conductor represents a false input and no current represents a true input. A positive voltage is induced on the output conductor for each of the gate elements 67, 68, 69, 70 which has been set in the false condition, while a negative voltage is induced on the output conductor by the gate element 71 when it has been set in the false state. If all the gate elements except 71 are in the true condition and gate element 71 is in the false condition, the output ABDEFC will be negative indicating a true condition. If the gate element 71 is in the true condition, the output ABDEFC will be a zero or no pulse output indicating a false condition. If more than one of the elements 67, 68, 69, 70, has a positive output pulse (false), while the element 71 has a negative output pulse (false) or a zero output (true), then the output voltage ABDEFC will be positive, also a false condition. As in the system of FIG. 4, the various outputs from the two level system of FIG. 5 are connected to succeeding gate circuits which respond only to negative pulses. The diode gate circuit 64 of FIG. 4 would be a typical example, with this gate circuit functioning as an *or* gate.

Another typical arrangement of the multilevel logic system would be ten of the magnetic gate elements threaded by a single output conductor, with each gate element having three first level *and* inputs. This would produce a thirty term *and* proposition at the output conductor and nine additional product terms accessible at the output conductor between each gate element. Other combinations will readily occur to one skilled in this field.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a multiple level logic system, the combination of:
   a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
   a strobe conductor passing through the first opening of each of said elements respectively;
   means for generating a current pulse on the strobe conductor of each of said elements simultaneously, with said pulse of a magnitude to set the flux about the first opening to one state;
   a plurality of input current pulse conductors, with at least one input conductor passing through the second opening of each element;
   means for generating input current pulses on predetermined input conductors, with the input pulses preceding the strobe pulses providing a first level *and* operation for the input conductors at each element;
   an output conductor passing through the second opening of each of said elements providing a second level *and* operation for the outputs of said elements;
   a first diode gate circuit having a plurality of inputs and an output;

a second diode gate circuit having a plurality of inputs and an output;
means for connecting said output conductor to one of said first diode gate inputs;
means for connecting the output of said first diode gate circuit to one of said second diode gate circuit inputs;
and means for connecting other circuit outputs to the remaining inputs of said first and second diode gate circuits providing third and fourth level logical operations at said first and second gate circuits respectively.

2. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
a first *and* gate having a plurality of inputs and an output;
a second *and* gate having a plurality of inputs and an output;
means for connecting said output conductor to one of said first gate inputs;
means for connecting the output of said first gate to one of said second gate inputs;
and means for connecting other circuit outputs to the remaining inputs of said first and second gates providing third and fourth level *and* operations at said first and second gates respectively.

3. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
an *or* gate having a plurality of inputs and an output;
an *and* gate having a plurality of inputs and an output;
means for connecting said output conductor to one of said *or* gate inputs;
means for connecting the output of said *or* gate to one of said *and* gate inputs;
and means for connecting other circuit outputs to the remaining inputs of said *or* and *and* gates providing third level *or* and fourth level *and* operations.

4. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
a first gate circuit having a plurality of inputs and an output;
means for connecting said output conductor to one of said first gate current inputs;
a second gate circuit having a plurality of inputs and an output, with said first gate circuit output connected as an input to said second gate circuit;
an amplifier having an input and an output, with said second gate circuit output connected as an input to said amplifier;
another magnetic gate element having a strobe conductor passing through the first opening and input and output conductors passing through the second opening, with the amplifier output connected to an input conductor and with an output conductor connected to another input of said first gate circuit providing a third level logical operation;
and means for connecting another circuit output as another input to said second gate circuit providing a fourth level logical operation.

5. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements, with said conductor of one polarity in predetermined elements and the opposite polarity in one element providing a second level *and* operation for the outputs of said elements and a first level *or* operation at said one element;
a first gate circuit having a plurality of inputs and an output;
a second gate circuit having a plurality of inputs and an output;
means for connecting said output conductor to one of said first gate inputs;
means for connecting the output of said first gate circuit to one of said second gate circuit inputs;
and means for connecting other circuit outputs to the remaining inputs of said first and second gate circuits providing third and fourth level logical operations at said first and second gate circuits respectively.

6. In a multiple level logic system, the combination of:
a plurality of magnetic gate elements, each of said gate elements comprising a block of magnetic material having two stable states of magnetic remanence and first and second nonparallel openings therethrough such that a current through an opening a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
a first gate circuit having a plurality of inputs and an output;
a second gate circuit having a pair of inputs and an output;
means for connecting said output conductor to one of said first gate inputs;
means for connecting other circuit outputs to the remaining inputs of said first gate circuit providing a third level logical operation at said first gate circuit;
means for connecting the output of said first gate circuit to one of said second gate circuit inputs;
and means for generating a current pulse at the other input of said second gate circuit concurrent with the current pulse on the strobe conductor activating said second gate in synchronism with the strobing of said elements.

7. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
a gate circuit having a plurality of inputs and an output;
means for connecting said output conductor to one of said gate circuit inputs;
and means for connecting other circuit outputs to the remaining inputs of said gate circuit providing a third level logical operation at said gate circuit.

8. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
an *and* gate having a plurality of inputs and an output;
means for connecting said output conductor to one of said *and* gate inputs;
and means for connecting other circuit outputs to the remaining inputs of said *and* gate providing a third level logical operation at said *and* gate.

9. In a multiple level logic system, the combination of:
a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
a strobe conductor passing through the first opening of each of said elements respectively;
means for generating a current pulse on the strobe conductor of each of said elements simultaneously, with said pulse of a magnitude to set the flux about the first opening to one state;
a plurality of input current pulse conductors, with at least one input conductor passing through the second opening of each element;
means for generating input current pulses on predetermined input conductors, with the input pulses preceding the strobe pulses providing a first level *and* operation for the input conductors at each element;
an output conductor passing through the second opening of each of said elements providing a second level *and* operation for the outputs of said elements;
an *or* gate circuit having a plurality of inputs and an output;
means for connecting said output conductor to one of said *or* gate circuit inputs;
and means for connecting other circuit outputs to the remaining inputs of said *or* gate circuit providing a third level logical operation at said *or* gate circuit.

10. In a multiple level logic system, the combination of:
  a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
  a strobe conductor passing through the first opening of each of said elements respectively;
  means for generating a current pulse on the strobe conductor of each of said elements simultaneously, with said pulse of a magnitude to set the flux about the first opening to one state;
  a plurality of input current pulse conductors, with at least one input conductor passing through the second opening of each element;
  means for generating input current pulses on predetermined input conductors, with the input pulses preceding the strobe pulses providing a first level *and* operation for the input conductors at each element;
  an output conductor passing through the second opening of each of said elements, with said conductor of one polarity in predetermined elements and the opposite polarity in one element providing a second level *and* operation for the outputs of said elements and a first level *or* operation at said one element;
  a gate circuit having a plurality of inputs and an output;
  means for connecting said output conductor to one of said gate circuit inputs;
  and means for connecting other circuit outputs to the remaining inputs of said gate circuit providing a third level logical operation at said gate circuit.

11. In a multiple level logic system, the combination of:
  a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
  a strobe conductor passing through the first opening of each of said elements respectively;
  means for generating a current pulse on the strobe conductor of each of said elements simultaneously, with said pulse of a magnitude to set the flux about the first opening to one state;
  a plurality of input current pulse conductors, with at least one input conductor passing through the second opening of each element;
  means for generating input current pulses on predetermined input conductors, with the input pulses preceding the strobe pulses providing a first level *and* operation for the input conductors at each element;
  a first output conductor passing through the second opening of each of a group of said elements providing a second level *and* operation for the outputs of said group of elements;
  a second output conductor passing through the second opening of each of another group of said elements providing a second level *and* operation for the outputs of said other group of elements;
  a gate circuit having a plurality of inputs and an output;
  means for connecting said first output conductor to one of said gate circuit inputs;
  and means for connecting said second output conductor to another of said gate circuit inputs providing a third level logical operation at said gate circuit.

12. In a multiple level logic system, the combination of:
  a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
  a strobe conductor passing through the first opening of each of said elements respectively;
  means for generating a current pulse on the strobe conductor of each of said elements simultaneously, with said pulse of a magnitude to set the flux about the first opening to one state;
  a plurality of input current pulse conductors, with at least one input conductor passing through the second opening of each element;
  means for generating input current pulses on predetermined input conductors, with the input pulses preceding the strobe pulses providing a first level *and* operation for the input conductors at each element;
  and an output conductor passing through the second opening of each of said elements providing a second level *and* operation for the outputs of each of said elements.

13. In a multiple level logic system, the combination of:
  a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;
  a strobe conductor passing through the first opening of each of said elements respectively;
  means for generating a current pulse on the strobe conductor of each of said elements simultaneously, with said pulse of a magnitude to set the flux about the first opening to one state;
  a plurality of input current pulse conductors, with at least one input conductor passing through the second opening of each element;
  means for generating input current pulses on predetermined input conductors, with the input pulses preceding the strobe pulses providing a first level *and* operation for the input conductors at each element;
  and an output conductor passing through the second opening of each of said elements, with said conductor of one polarity in predetermined elements and the opposite polarity in at least one element providing a second level *and* operation for the outputs of said elements and a first level *or* operation at said one element.

14. In a multiple level logic system, the combination of:
  a plurality of magnetic gate elements, each of said gate elements comprising a block of magnetic material having two stable states of magnetic remanence and first and second nonparallel openings therethrough such that a current through an opening produces a flux about such openings and substantially zero net flux about the other opening;
  a strobe conductor passing through the first opening of each of said elements respectively;
  means for generating a current pulse on the strobe conductor of each of said elements simultaneously, with said pulse of a magnitude to set the flux about the first opening to one state;
  a plurality of input current pulse conductors, with at least one input conductor passing through the second opening of each element;
  means for generating input current pulses on predetermined input conductors, with the input pulses preceding the strobe pulses providing a first level *and* operation for the input conductors at each element;

a first output conductor passing through the second opening of each of a group of said elements providing a second level *and* operation for the outputs of said group of elements;

a second output conductor passing through the second opening of each of another group of said elements providing a second level *and* operation for the outputs of said other group of elements;

a first *and* gate having a plurality of inputs and an output;

a second *and* gate having a plurality of inputs and an output;

means for connecting said first output conductor to one of said first *and* gate inputs;

means for connecting said second output conductor to another of said first *and* gate inputs providing a third level *and* operation at said first gate;

means for connecting the output of said first gate to one of said second *and* gate inputs;

and means for connecting another circuit output to another input of said second *and* gate providing a fourth level *and* operation at said second gate.

15. In a multiple level logic system, the combination of:

a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;

a strobe conductor passing through the first opening of each of said elements respectively;

means for generating a current pulse on the strobe conductor of each of said elements simultaneously, with said pulse of a magnitude to set the flux about the first opening to one state;

a plurality of input current pulse conductors, with at least one input conductor passing through the second opening of each element;

means for generating input current pulses on predetermined input conductors, with the input pulses preceding the strobe pulses providing a first level *and* operation for the input conductors at each element;

a first output conductor passing through the second opening of each of a group of said elements providing a second level *and* operation for the outputs of said group of elements;

a second output conductor passing through the second opening of each of another group of said elements providing a second level *and* operation for the outputs of said other group of elements;

an *or* gate having a plurality of inputs and an output;

an *and* gate having a plurality of inputs and an output;

means for connecting said first output conductor to one of said *or* gate inputs;

means for connecting said second output conductor to another of said *or* gate inputs providing a third level *or* operation at said gate;

means for connecting the output of said *or* gate to one of said *and* gate inputs;

and means for connecting another circuit output to another input of said *and* gate providing a fourth level *and* operation at said gate.

References Cited in the file of this patent

UNITED STATES PATENTS

| | | |
|---|---|---|
| 2,934,270 | Logue et al. | Apr. 26, 1960 |
| 2,950,461 | Tryon | Aug. 23, 1960 |
| 2,985,768 | Bobeck | May 23, 1961 |

OTHER REFERENCES

Publication I: Electronic Design, pp. 28–31, August 5, 1959.

Textbook: Arithmetic Operations in Digital Computers, Richards, R. D., D. Van Nostrand Co. Inc., N.Y., 1958, pp. 26–35.

UNITED STATES PATENT OFFICE
CERTIFICATE OF CORRECTION

Patent No. 3,155,834                          November 3, 1964

Robert M. MacIntyre

It is hereby certified that error appears in the above numbered patent requiring correction and that the said Letters Patent should read as corrected below.

In the grant, line 3, and in the heading to the printed specification, lines 4 and 5, for "a corporation of Michigan" read -- a corporation of Delaware --; column 1, line 31, for "gtae" read -- gate --; column 2, line 71, after "it" insert -- is --; column 3, line 14, for "mganetic" read -- magnetic --; column 5, line 70, for "suitable" read -- suitably --; column 6, line 4, after "67" insert a comma; column 9, line 22, before "a flux" insert -- produces --; column 12, line 63, for "openings" read -- opening --.

Signed and sealed this 30th day of March 1965.

(SEAL)
Attest:

ERNEST W. SWIDER                          EDWARD J. BRENNER
Attesting Officer                            Commissioner of Patents